(12) United States Patent
Matsumoto

(10) Patent No.: US 9,137,395 B2
(45) Date of Patent: Sep. 15, 2015

(54) IMAGE PROCESSING DEVICE AND COMPUTER-READABLE STORAGE MEDIUM FOR USE IN CONNECTION WITH USB DATA PACKETS

(71) Applicant: Hideto Matsumoto, Nagoya (JP)

(72) Inventor: Hideto Matsumoto, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/089,923

(22) Filed: Nov. 26, 2013

(65) Prior Publication Data

US 2014/0146364 A1 May 29, 2014

(30) Foreign Application Priority Data

Nov. 26, 2012 (JP) ................................. 2012-257187

(51) Int. Cl.
*G06F 3/12* (2006.01)
*H04N 1/00* (2006.01)
*H04L 29/08* (2006.01)
*H04L 12/24* (2006.01)

(52) U.S. Cl.
CPC ....... *H04N 1/00217* (2013.01); *H04N 1/00236* (2013.01); *G06F 3/1209* (2013.01); *G06F 3/1236* (2013.01); *G06F 3/1286* (2013.01); *G06F 3/1288* (2013.01); *H04L 41/0246* (2013.01); *H04L 67/141* (2013.01); *H04N 2201/0041* (2013.01); *H04N 2201/0046* (2013.01); *H04N 2201/0049* (2013.01); *H04N 2201/0094* (2013.01)

(58) Field of Classification Search
None
See application file for complete search history.

(56) References Cited

U.S. PATENT DOCUMENTS

| 7,051,124 | B2* | 5/2006 | Ishida et al. | 710/29 |
| 2003/0197890 | A1* | 10/2003 | Satake et al. | 358/1.15 |
| 2006/0153614 | A1* | 7/2006 | Aoki | 400/61 |
| 2007/0091362 | A1* | 4/2007 | Tien et al. | 358/1.15 |
| 2011/0302512 | A1* | 12/2011 | Ishii | 715/760 |
| 2012/0038940 | A1* | 2/2012 | Boskovic | 358/1.13 |
| 2014/0129674 | A1* | 5/2014 | Matsuda | 709/217 |

FOREIGN PATENT DOCUMENTS

JP 2003-316712 A 11/2003

* cited by examiner

*Primary Examiner* — Miya J Cato
(74) *Attorney, Agent, or Firm* — Scully, Scott, Murphy & Presser, P.C.

(57) ABSTRACT

An image processing device may comprising a USB I/F and a control device. The USB I/F may be configured to receive USB data packets transmitted by a data processing device. The USB I/F may be configured to cause a specific buffer corresponding to one USB endpoint for reception to store content data included in the received USB data packets. The control device may be configured to: execute one or more processing on the basis of an HTTP command; execute image processing on the basis of a particular command other than the HTTP command; and execute content data allocation processing. The content data allocation processing may include: causing content data including the HTTP command to be processed in the execution of the one or more processing; and causing content data including the particular command to be processed in the execution of the image processing.

13 Claims, 7 Drawing Sheets

FIG. 7

| 121 | HTTP/1.1 200 OK |
| 122 | Date: Sun, 11 Jan 2004 16:06:23 GMT<br>Server: Apache/1.3.22 (Unix) (Red-Hat/Linux)<br>Last-Modified: Sun, 07 Dec 2003 12:34:18 GMT<br>ETag: "1dba6-131b-3fd31e4a"<br>Accept-Ranges: bytes<br>Content-Length: 4891<br>Connection: Close<br>Content-Type: text/html |
| 123 | \<html\><br><br>\</html\> |

IMAGE PROCESSING DEVICE AND COMPUTER-READABLE STORAGE MEDIUM FOR USE IN CONNECTION WITH USB DATA PACKETS

CROSS-REFERENCE TO RELATED APPLICATION

This application claims priority to Japanese Patent Application No. 2012-257187, filed on Nov. 26, 2012, the contents of which are hereby incorporated by reference into the present application.

TECHNICAL FIELD

The technology disclosed in this specification relates to an image processing device and the like that can communicate various data.

BACKGROUND ART

There has been disclosed a technique for providing a Web server function in an image processing device and displaying a setting screen and the like of the image processing device on a Web browser executed in a terminal device. There has been known a standard called Internet Printing Protocol (referred to as IPP) for connecting the image processing device and the terminal device through the Internet and causing the image processing device to process an image via the Internet. Further, there has been known a standard called IPP over USB for performing communication by the IPP in an environment in which an image processing device and a terminal device are connected by a universal serial bus (referred to as USB).

The USB can include a plurality of logical channels called endpoints. Since the USB includes the plurality of endpoints, it is possible to form a plurality of communication routes using the USB that physically performs serial communication. There has been known an image processing device connected to a terminal device such as a personal computer (referred to as PC) by the USB. Such an image processing device includes endpoints for control and for printing data reception and endpoints for printing state transmission and reception. Consequently, it is possible to perform, via the USB, transmission of printing data from the PC to the image processing device and transmission of information from the image processing device to the PC.

SUMMARY

Endpoints are sometimes mounted on hardware such as an application specific integrated circuit (referred to as ASIC) that controls USB communication. In this case, when the number of endpoints is increased to execute communication by the IPP over USB standard, this sometimes causes a situation in which a mounting area of the hardware increases or a situation in which a price of the hardware increases.

In one aspect of the teachings disclosed herein, an image processing device may be provided. The image processing device may comprise a Universal Serial Bus Interface (USB I/F) and a control device. The USB I/F may be configured to receive USB data packets transmitted by a data processing device according to a USB protocol. The USB I/F may be configured to cause a specific buffer to store content data included in the received USB data packets. The specific buffer may be a buffer corresponding to one USB endpoint for reception. The control device may be configured to: execute one or more processing on the basis of a HyperText Transfer Protocol (HTTP) command; execute image processing on the basis of a particular command other than the HTTP command; and execute content data allocation processing. The content data allocation processing may include: causing content data including the HTTP command stored in the specific buffer to be processed in the execution of the one or more processing; and causing content data including the particular command stored in the specific buffer to be processed in the execution of the image processing.

BRIEF DESCRIPTION OF DRAWINGS

FIG. 7 is a diagram showing an example of an HTTP response message.

EMBODIMENT

<Configuration of Communication System>

Figure 1:
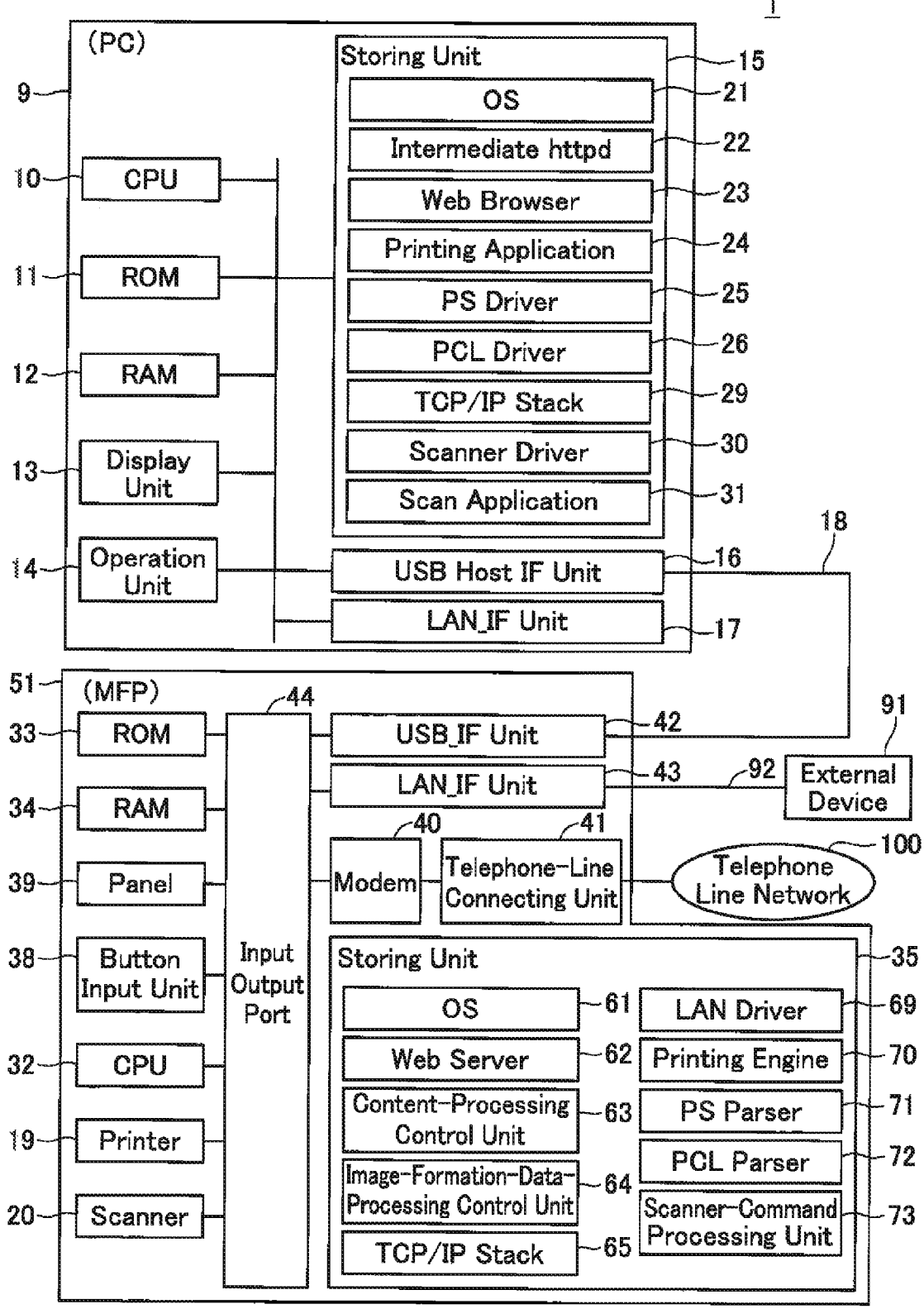
FIG. 1 is a diagram showing an electrical configuration of a communication system 1.

FIG. 1 illustrates an electrical configuration of a communication system 1, which is illustrated as a first embodiment of the present application. The communication system 1 includes a personal computer 9, a multifunction peripheral (referred to as MFP) 51, and external device 91. The MFP 51 includes a printer function, a scanner function, a copy function, a facsimile function, and so on. PCs and cellphones are examples of the external device 91.

The configuration of the PC 9 will be described. The PC 9 includes a CPU 10, a ROM 11, a RAM 12, a display unit 13, an operation unit 14, a storage unit 15, a USB host interface unit (referred to as USB host IF unit in FIG. 1) 16, and a local area network interface unit (referred to as LAN_IF unit in FIG. 1) 17.

The CPU 10 executes programs that are stored in the ROM 11 and the storage unit 15 to control each unit of the PC 9. The programs to be executed by the CPU 10, data, and so on are stored in the ROM 11. The RAM 12 is used as a main storage device for the CPU 10 to execute various processes. The display unit 13 includes a display device such as a liquid crystal display, a display drive circuit for driving the display device, and so on. The operation unit 14 includes a keyboard, a mouse, an interface to which the keyboard and the mouse are connected, and so on. The storage unit 15 is a device for storing various programs and data using a non-volatile memory such as a hard disk and a flash memory. Programs such as an operating system (referred to as OS) 21, an intermediate httpd (an abbreviation for http daemon) 22, a web browser 23, a printing application 24, a PS driver 25, a PCL driver 26, a TCP/IP stack 29, a scanner driver 30, and a scan application 31 are stored in the storage unit 15. Contents of these programs will be described later.

The USB-host interface unit 16 is an interface for performing communication with the MFP 51 via a USB 18. The USB-host interface unit 16 includes a USB host controller (not shown in the figure), a jack (not shown in the figure) to which a USB cable is connected, and endpoints EP10 to EP13 (see FIG. 2). The endpoints EP10 to EP13 are first-in first-out (referred to as FIFO) buffers. The endpoint EP10 is an endpoint used for control transfer and capable of performing bidirectional communication. The endpoints EP11 to EP13 are endpoints for communicating various data. Like endpoints EP1 to EP3 explained below, each of the endpoints EP11 to EP13 includes an endpoint for reception and an endpoint for transmission as a pair. However, explanation and illustration of the endpoint for reception and the endpoint for transmission are omitted. The USB-host interface unit 16 may be configured by hardware such as an ASIC. The LAN interface unit 17 is an interface for communicating with not-shown communication terminals such as a PC, a cellular phone, and a portable communication terminal via a communication network such as a local area network or the Internet.

The configuration of the MFP 51 will be described. The MFP 51 includes, primarily, a printer 19, a scanner 20, a CPU 32, a ROM 33, a RAM 34, a storage unit 35, a button input unit 38, a panel 39, a modem 40, a telephone circuit connection unit 41, a USB interface unit (referred to as USB_IF unit in FIG. 1) 42, and a local area network interface unit (referred to as LAN_I/F unit in FIG. 1) 43. These constituent elements are communicable with one another through an input/output port 44. The ROM 33 stores various programs. The RAM 34 is a volatile memory. The CPU 32 executes the programs stored in the RUM 33 and the storage unit 35.

The storage unit 35 is a device for storing various programs and data using a non-volatile memory such as a hard disk and a flash memory. The programs such as an OS 61, a web server 62, a content-processing control unit 63, an image-formation-data-processing control unit 64, a TCP/IP stack 65, a LAN driver 69, a printing engine 70, a PS parser 71, a PCL parser 72, and a scanner-command processing unit 73 are stored in the storage unit 35. Content of these programs will be described later.

The USB interface unit 42 is an interface for performing communication with the PC 9 via the USB 18. The USB interface unit 42 is enabled to receive USB data packets transmitted by the PC 9 according to a USB protocol. The USB interface unit 42 may be configured by hardware such as an ASIC. The LAN interface unit 43 is a portion that communicates with the external device 91 through LAN communication 92. The button input unit 38 is a key for executing each function in the MFP 51. The button input unit 38 may be configured integrally with the panel 39 in the form of a touch panel. The panel 39 displays various images. The printer 19 is a portion that executes printing on printing paper. The scanner 20 is a portion that scans a paper document to generate image data. The modem 40 modulates document data, which is to be transmitted through the facsimile function, into a signal that can be transmitted to a telephone circuit network 100 and then transmits the signal through the telephone circuit connection unit 41, or receives a signal that is inputted from the telephone circuit network 100 through the telephone circuit connection unit 41 and then demodulates the signal into the document data.

<Block Diagram of the PC and the MFP>

Figure 2:
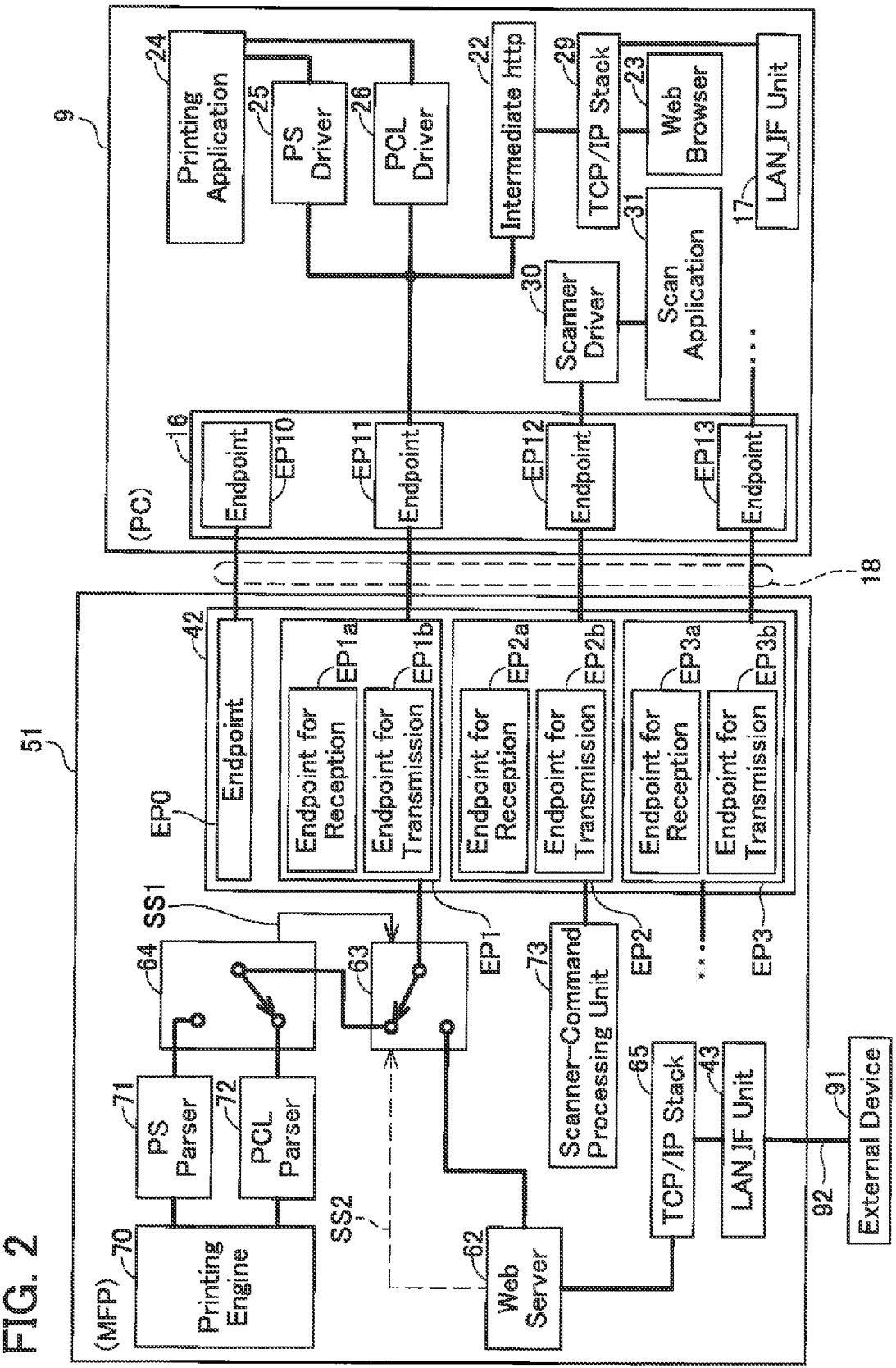
FIG. 2 is a block diagram of a PC and an MFP.

A block diagram of the PC 9 and the MFP 51 is explained with reference to FIG. 2. The PC 9 includes the intermediate httpd 22, the Web browser 23, the printing application 24, the PS driver 25, the PCL driver 26, the TCP/IP stack 29, the scanner driver 30, the scan application 31, the USB-host interface unit 16, and the LAN interface unit 17.

Each of the Web browser 23 and the LAN interface unit 17 communicates with the USB-host interface unit 16 via the TCP/IP stack 29 and the intermediate httpd 22. The printing application 24 communicates with the USB-host interface unit 16 via the PCL driver 26 and communicates with the USB-host interface unit 16 via the PS driver 25. The scan application 31 communicates with the USB-host interface unit 16 via the scanner driver 30.

The Web browser 23 is a computer program used as a user interface for a user to perform various kinds of setting of the MFP 51. As the Web browser 23, a generally used browser can be used. The intermediate httpd 22 is a computer program for performing mediation between the Web server 62 included in the MFP 51 and the Web browser 23. The intermediate httpd 22 performs an operation for, for example, transmitting contents in response to a request from the user. The TCP/IP stack 29 is one computer program group in which computer programs concerning a protocol of TCP/IP communication are collected.

The printing application 24 is a computer program for communicating printing data. Examples of the printing application 24 include a spooler configured to temporarily store printing data. The printing application 24 may be provided as a part of the OS 21. The PS driver 25 is a computer program adapted to a PostScript (registered trademark of Adobe Systems Incorporated) language and for controlling the MFP 51. Printing data described in the PostScript (registered trademark) language is output from the PS driver 25. The PCL driver 26 is a computer program adapted to a printer control language (PCL) language and for controlling the MFP 51. Printing data described in the PCL language is output from the PCL driver 26.

The scan application 31 is a computer program for communicating image data. The scanner driver 30 is a computer program for controlling the MFP 51. The USB-host interface unit 16 is a computer program for executing communication performed via the USB 18.

A block diagram of the MFP 51 is explained with reference to FIG. 2. The MFP 51 includes a USB interface unit 42, the content-processing control unit 63, the TCP/IP stack 65, the Web server 62, the LAN interface unit 43, the image-formation-data-processing control unit 64, the PS parser 71, the PCL parser 72, the scanner-command processing unit 73, and the printing engine 70. The USB interface unit 42 includes endpoints EP1 to EP3.

The content-processing control unit 63 is enabled to select and communicate with one of the Web server 62 and the image-formation-data-processing control unit 64. The image-formation-data-processing control unit 64 is enabled to select and communicate with one of the PS parser 71 and the PCL parser 72.

The USB interface unit 42 is a section for executing communication performed via the USB 18. The USB interface unit 42 may be configured as hardware or may be configured as software. The USB interface unit 42 includes endpoints EP0 to EP3. The endpoints are FIFO buffers. The endpoint EP0 is an endpoint used for control transfer and capable of performing bidirectional communication. The endpoints EP1 to EP3 are endpoints for communicating various data. The endpoint EP1 includes an endpoint for reception EP1a and an endpoint for transmission EP1b as a pair. Consequently, the endpoint EP1 is enabled to perform bidirectional communication. A configuration of the endpoints EP2 and EP3 are the same as a configuration of the endpoint EP1. Therefore, explanation of the configuration is omitted. Since the USB interface unit 42 includes the endpoints EP1 to EP3, the USB 18 can be treated as three parallel communication routes.

The content-processing control unit 63 is a computer program for selecting one of the Web server 62 and the image-formation-data-processing control unit 64 and executing data allocation processing. In the data allocation processing executed by the content-processing control unit 63, data including a particular command is communicated between the endpoint EP1 and the printing engine 70. The particular command is a command other than a HTTP command. Data including the HTTP command is communicated between the endpoint EP1 and the Web server 62.

The LAN interface unit 43 is a computer program for executing the LAN communication 92. The TCP/IP stack 65 is one computer program group in which computer programs concerning the protocol of TCP/IP communication are collected.

The Web server 62 is a computer program having an information transmission function by WWW. The Web server 62 is called httpd as well. The Web server 62 plays a function of accumulating information such as HTML documents and images in advance and transmitting these kinds of information in response to requests from the Web browser 23 and the external device 91. That is, the Web server 62 can execute various kinds of processing on the basis of the HTTP command included in USB data packets received by the USB interface unit 42 via the USB 18. The Web server 62 can also execute various kinds of processing on the basis of the HTTP command included in TCP data packets received by the LAN driver 69 via the LAN communication 92.

The image-formation-data-processing control unit 64 is a computer program for selecting one of the PS parser 71 and the PCL parser 72 and establishing communication with the content-processing control unit 63. The PCL parser 72 is a computer program for parsing data described in the PCL language and enabling the printing engine 70 to perform printing processing. The PS parser 71 is a computer program for parsing data described in the PostScript (registered trademark) language and enabling the printing engine 70 to perform the printing processing. The printing engine 70 is a computer program for controlling the printer 19 and executing printing. The printing engine 70 performs processing on the basis of data including the particular command other than the HTTP command (e.g., printing data). The scanner-command processing unit 73 is a computer program for controlling the scanner 20 to acquire image data. The scanner-command processing unit 73 performs processing on the basis of data including the particular command other than the HTTP command (e.g., scan data). The image-formation-data-processing control unit 64 executes data allocation processing and end detection processing for data communication explained below.

<Communication Between the PC and the MFP>

The PC 9 at least performs communication explained below with the MFP 51 via the USB 18. (1) Communication for setting the MFP 51. (2) Communication for printing for transmitting printing data to the MFP 51. (3) Communication for scan for receiving image data from the MFP 51. In the communication for setting, data including the HTTP command is stored in USB data packets and transmitted and received. On the other hand, in the communication for printing and the communication for scan, data including the particular command other than the HTTP command is stored in USB data packets and transmitted and received. In explanation in this embodiment, when the MFP 51 receives data of the communication for setting and data of the communication for printing, one endpoint for reception EP1a is used. When the MFP 51 transmits data of the communication for setting and data of the communication for printing, one endpoint for transmission EP1b is used. When the MFP 51 receives data of the communication for scan, the endpoint for reception EP2a is used. When the MFP 51 transmits data of the communication for scan, the endpoint for transmission EP2b is used.

Figure 5:
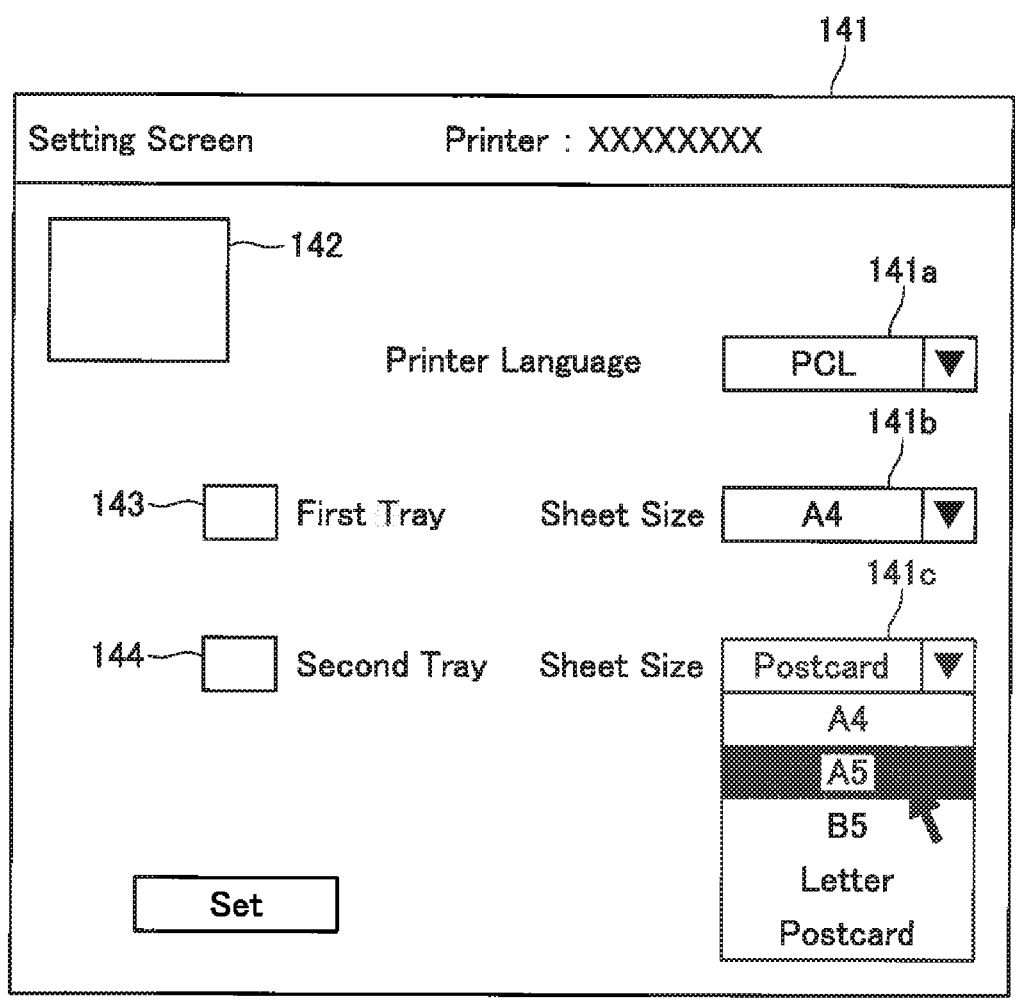
FIG. 5 is a diagram showing an example of a setting screen.

An example of the communication for setting is explained. As an example, the communication for setting in executing one task for causing the display unit 13 of the PC 9 to display a setting screen 141 shown in FIG. 5 is explained. On the setting screen 141, various kinds of setting for the MFP 51 can be performed. Specifically, a printer language 141a, a sheet size 141b set in a first tray, and a sheet size 141c set in a second tray can be set. An image 142, an image 143, and an image 144 are displayed on the setting screen 141. Image data for displaying the images 142 to 144 are respectively referred to as GIF1, GIF2, and GIF3.

USB configuration is performed according to connection of the USB-host interface unit 16 and the USB interface unit 42 by a USB cable. The USB configuration is processing for performing various kinds of setting for communication performed using the USB 18. In the USB configuration, data of configuration is transmitted from the side of the MFP 51, which is a USB device, to the side of the PC 9, which is a USB host, via the endpoints EP0 and EP10. In an explanation example in this embodiment, the data of configuration indicates that (a) the endpoint for reception EP1a is used for reception of data transmitted from the Web browser 23 and the printing application 24, (b) the endpoint for transmission EP1b is used for data transmission to the Web browser 23 and the printing application 24, (c) the endpoint for reception EP2a is used for reception of data transmitted from the scan application 31, and (d) the endpoint for transmission EP2b is used for data transmission to the scan application 31. The PC 9 returns, to the MFP 51, identification information indicating that the endpoint EP11 is used for transmission and reception of data between the Web browser 23 and the printing application 24 and the MFP 51 and the endpoint EP12 is used for transmission and reception between the scan application 31 and the MFP 51. Consequently, the USB configuration is completed. Therefore, as shown in FIG. 2, setting for performing communication using the endpoints EP11 and EP1 is performed for the printing application 24 and the Web browser 23. Setting for performing communication using the endpoints EP12 and EP2 is performed for the scan application 31.

When a specific port 80 (e.g., http://127.0.0.1:80) of a local host is accessed by the Web browser 23, the Web browser 23 issues a GET command for acquiring a file of a main page of the specific port 80. The GET command is a type of the HTTP command. The issued GET command is transmitted to the intermediate httpd 22 via the TCP/IP stack 29. The intermediate httpd 22 transmits the GET command for the USB-host interface unit 16 on the basis of the USB protocol. The USB-host interface unit 16 determines, on the basis of the USB configuration, that the endpoints EP11 and EP1 are used for transmission and reception of data to and from the Web browser 23. Therefore, the USB-host interface unit 16 designates the endpoint EP1 and transmits the GET command.

The transmitted GET command is received by the endpoint for reception EP1a and transmitted to the Web server 62 via the content-processing control unit 63. The Web server 62 generates, as a response to the GET command, data of a main page in an HTML/XML format for displaying the setting screen 141 and transmits the data to the endpoint for transmission EP1b of the USB interface unit 42. The USB interface unit 42 determines, on the basis of the USB configuration, that the endpoints EP11 and EP1 are to be used for transmission and reception of data to and from the Web browser 23. Therefore, the USB interface unit 42 designates the endpoint EP11 and transmits the data of the main page.

The transmitted data of the main page is received by the endpoint EP11 and transmitted to the Web browser 23. The Web browser 23 analyzes the data of the main page and causes the display unit 13 to display the setting screen 141. The Web browser 23 determines that the Web browser 23 lacks image data (e.g., GIF1, GIF2, and GIF3) to display the main page and requests the Web server 62 to transmit the lacking image data. Specifically, a GET command for the GIF1 to GIF3 is transmitted from the Web browser 23 to the Web server 62. Image data corresponding to the GIF1 to the GIF3 is returned from the Web server 62 to the Web browser 23. Contents of transmission processing for the GET command and return processing for the image data are the same as the processing contents explained above. Therefore, explanation of the transmission processing and the return processing is omitted. The Web browser 23 displays the images 142 to 144 on the setting screen 141. Consequently, the task of opening the setting screen 141 is completed. As explained above, when the task of opening the setting screen 141 is executed, it is necessary to communicate "a group of data" of the data of the main page and the image data corresponding to the GIF1 to the GIF3.

When the user inputs setting parameters using the setting screen 141, the Web browser 23 issues a PUT command for reflecting the input setting parameters on the Web browser 23. The Put command is a type of the HTTP command. The issued PUT command is transmitted to the Web browser 23 through the TCP/IP stack 29, the intermediate httpd 22, the endpoints EP11 and EP1, and the content-processing control unit 63. The Web server 62 causes, on the basis of the PUT command, a not-shown setting unit to store the setting parameters.

<Details of Communication Processing>

Figure 3:
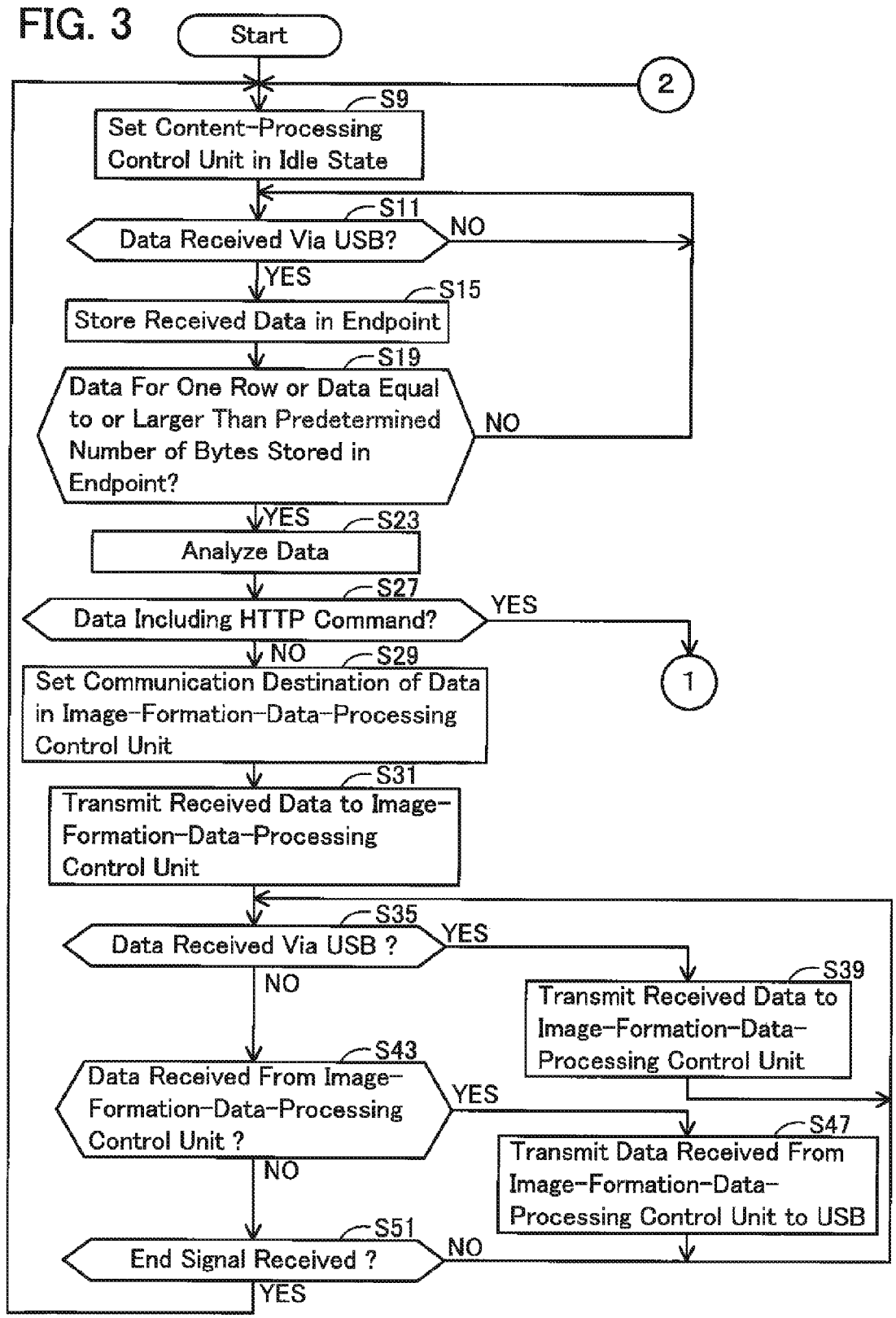
FIG. 3 is a flowchart of communication processing performed in the MFP.
Figure 4:
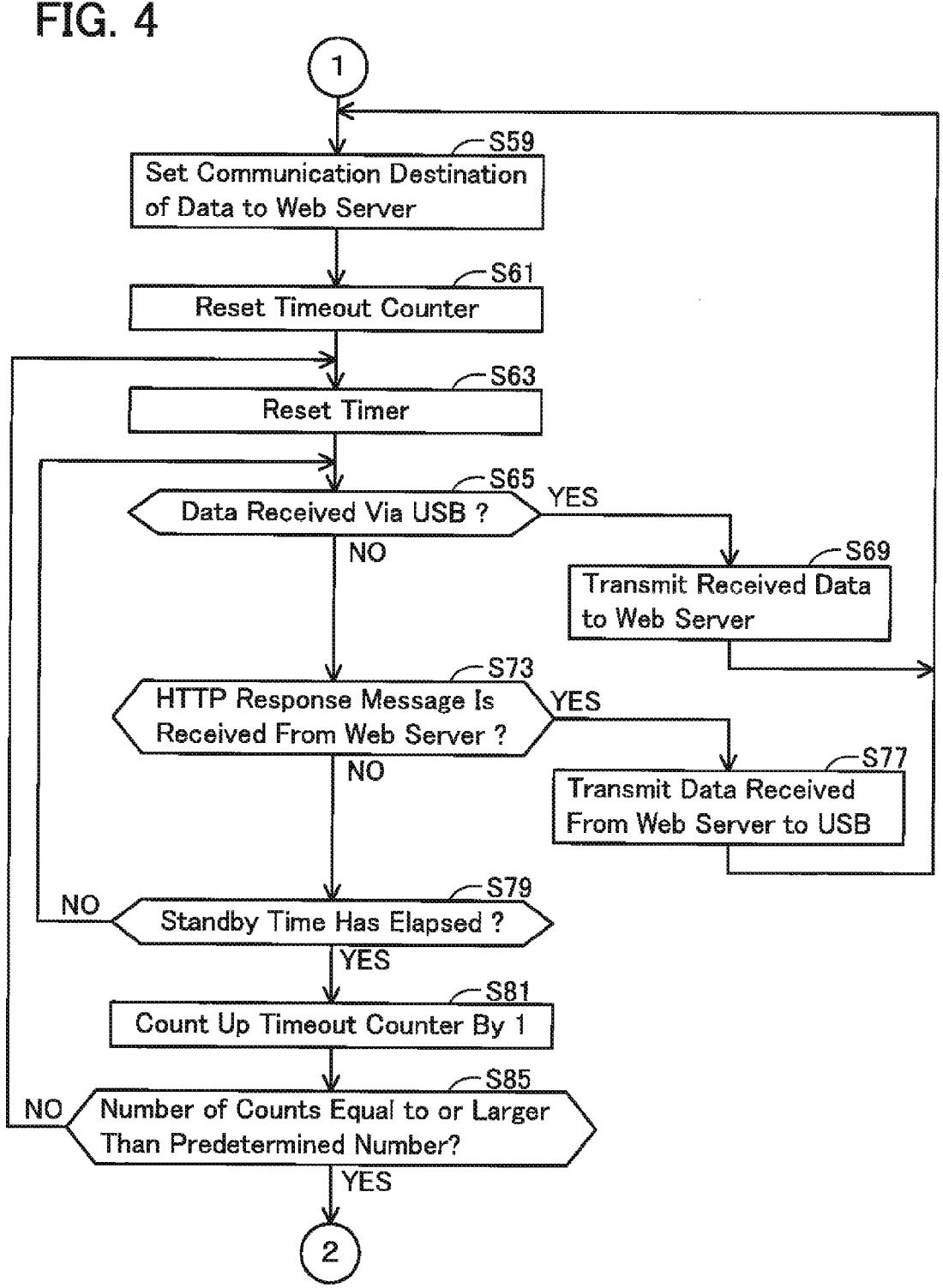
FIG. 4 is a flowchart of the communication processing performed in the MFP.

Communication processing performed in the MFP 51 is explained with reference to FIGS. 3 and 4. Various computer programs executed in the MFP 51 are executed as resident programs. The processing is started when the MFP 51 is turned on. In the following explanation, for example, the content-processing control unit 63 sometimes refers to the CPU 32 executing the content-processing control unit 63.

In S9, the content-processing control unit 63 is set in an idle state. Specifically, the content-processing control unit 63 is set in a state in which a communication destination of the content-processing control unit 63 is neither the Web server 62 nor the image-formation-data-processing control unit 64. In S11, the USB interface unit 42 determines whether data is received from the PC 9 via the USB 18. When data is not received (S11: NO), the processing returns to S11. When data is received (S11: YES), the processing proceeds to S15.

In S15, the USB interface unit 42 causes the endpoint EP1 to store the received data. Since the endpoint EP1 is a FIFO buffer, the received data is stored in the endpoint EP1 in order of reception. In S19, the USB interface unit 42 determines whether data for one row of a header portion is stored or data equal to or larger than a predetermined number of bytes set in advance is stored in the endpoint EP1. The determination concerning whether the data for one row of the header portion is stored may be performed according to, for example, whether data corresponding to a line feed code is stored in the endpoint EP1. It is desirable to set the predetermined number of bytes to a number of bytes larger than a number of bytes necessary for describing a request row explained below. The predetermined number of bytes may be set in advance by, for example, a manufacturer of the MFP 51. When the data for one row of the header portion or the data equal to or larger than the predetermined number of bytes is not stored in the endpoint EP1 (S19: NO), the processing returns to S11. When the data for one row of the header portion or the data equal to or larger than the predetermined number of bytes is stored in the endpoint EP1 (S19: YES), the processing proceeds to S23.

Figure 6:
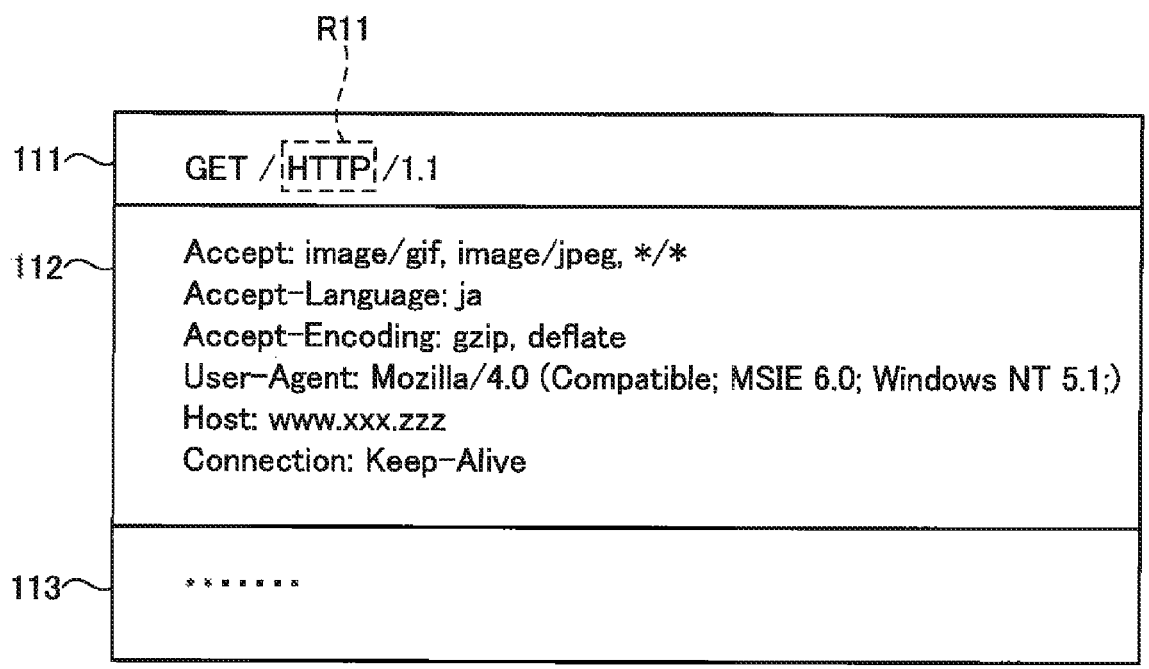
FIG. 6 is a diagram showing an example of an HTTP request message.

In S23, the content-processing control unit 63 analyzes the data stored in the endpoint EP1. In S27, the content-processing control unit 63 determines whether the data stored in the endpoint EP1 is data including the HTTP command. The determination can be performed by determining whether an HTTP request message is received. An example of the HTTP request message is shown in FIG. 6. As shown in FIG. 6, the HTTP request message includes a request row 111, a header 112, and a message body 113. The request row 111 is a row for informing the Web server 62 of processing desired to be executed by the Web server 62. The request row 111 includes three kinds of information, i.e., "method", "URL", and "a version of HTTP". The header 112 is information transmitted before the message body 113 and is information indicating various states. The message body 113 is a portion in which data described in an HTML, image data, and the like are included.

In the request row 111, a character string "HTTP" (see a region R11 in FIG. 6) is included as information for indicating a version of HTTP. Therefore, in S27, by determining whether the character string "HTTP" is present in the data stored in the endpoint EP1, the content-processing control unit 63 can determine whether the data stored in the endpoint EP1 is the HTTP request message.

When it is determined in S27 that the data stored in the endpoint EP1 is data including the HTTP command (S27: YES), the content-processing control unit 63 determines that the content-processing control unit 63 causes the Web server 62 to process the data received from the PC 9. Therefore, the processing proceeds to S59.

In S59, the content-processing control unit 63 sets the Web server 62 as a communication destination of the data. Specifically, the content-processing control unit 63 sets the Web server 62 as the communication destination of the content-processing control unit 63. Consequently, a communication route extending from the endpoint EP1 to the Web server 62 through the content-processing control unit 63 is established. In S61, the content-processing control unit 63 resets a not-shown timeout counter. In S63, the content-processing control unit 63 resets a not-shown timer.

In S65, the content-processing control unit 63 determines whether a data input via the USB 18 is performed. When the data input via the USB 18 is performed (S65: YES), the processing proceeds to S69. In S69, the content-processing control unit 63 transfers data received via the USB 18 to the Web server 62 via the content-processing control unit 63. The processing returns to S61.

On the other hand, when the data input via the USB 18 is not performed (S65: NO), the processing proceeds to S73. In S73, the content-processing control unit 63 determines whether an HTTP response message is received from the Web server 62. An example of the HTTP response message is shown in FIG. 7. As shown in FIG. 7, the HTTP response message includes a response row 121, a header 122, and a message body 123. The response row 121 is a row indicating a state of a response to an HTTP request. The header 122 is information indicating various states. The message body 123 is a portion including, for example, data described in the HTML.

When the HTTP response message is received (S73: YES), the processing proceeds to S77. In S77, the content-processing control unit 63 transfers the data received from the Web server 62 to the PC 9 via the content-processing control unit 63, the endpoint EP1, and the USB 18. The processing returns to S61.

On the other hand, when the HTTP response message is not received from the Web server 62 (S73: NO), the processing proceeds to S79. In S79, the content-processing control unit 63 determines, on the basis of the not-shown timer, whether a standby time set in advance has elapsed. The standby time may be set in advance by, for example, the manufacturer of the MFP 51. When the standby time has not elapsed (S79: NO), the processing returns to S65. When the standby time has elapsed (S79: YES), the processing proceeds to S81. In S81, the content-processing control unit 63 counts up the not-shown timeout counter by 1.

In S85, the content-processing control unit 63 determines whether a number of counts of the not-shown timeout counter is equal to or larger than a predetermined number. The predetermined number may be set by, for example, the manufacturer of the MFP 51. When the number of counts is not equal to or larger than the predetermined number (S85: NO), the processing returns to S63. On the other hand, when the number of counts is equal to or larger than the predetermined number (S85: YES), it is determined that a communication interval time of the data is larger than a predetermined time set in advance. In this case, it can be determined that communication of a group of data for executing one task is completed. Therefore, the processing returns to S9. The content-processing control unit 63 is returned to the idle state.

On the other hand, when it is determined in S27 that the data stored in the endpoint EP1 is not data including the HTTP command (S27: NO), it is determined that the content-processing control unit 63 causes the Web server 62 to process content data. Therefore, the processing proceeds to S29. In S29, the content-processing control unit 63 sets the image-formation-data-processing control unit 64 as the communication destination of the data. Specifically, the content-processing control unit 63 sets the image-formation-data-processing control unit 64 as the communication destination of the content-processing control unit 63. Consequently, a communication route extending from the endpoint EP1 to the image-formation-data-processing control unit 64 through the content-processing control unit 63 is established.

In S31, the content-processing control unit 63 transfers the data received via the USB 18 to the image-formation-data-processing control unit 64 through the content-processing control unit 63. The image-formation-data-processing control unit 64 executes data allocation processing for allocating the data to one of the PS parser 71 and the PCL parser 72. The data allocation processing may be performed by analyzing content of the transferred data and determining the type of the language used in the data. The determination of a type of a language may be performed by analyzing a header portion of the transferred data. When the type of the data cannot be determined even if the header portion is analyzed, the type of the language may be determined by analyzing a body portion after the header portion. When it is determined that the transferred data is described in the PostScript (registered trademark) language, the data is transmitted to the PS parser 71. When it is determined that the transferred data is described in the PCL language, the data is transmitted to the PCL parser 72.

The image-formation-data-processing control unit 64 executes end detection processing for data communication. The end detection processing for data communication is processing for detecting, by analyzing data input to the image-formation-data-processing control unit 64, an end of communication of a group of data for executing one task (e.g., a plurality of data for executing one printing processing). Upon detecting the end of the communication of the group of data, the image-formation-data-processing control unit 64 transmits an end signal SS1 to the content-processing control unit 63.

In S35, the content-processing control unit 63 determines whether a data input via the USB 18 is performed. When the data input via the USB 18 is performed (S35: YES), the processing proceeds to S39. In S39, the content-processing control unit 63 transfers the data received via the USB 18 and the endpoint EP1 to the image-formation-data-processing control unit 64. The processing returns to S35.

On the other hand, when the data input via the USB 18 is not performed (S35: NO), the processing proceeds to S43. In S43, the content-processing control unit 63 determines whether data is received from the image-formation-data-processing control unit 64. When data is received (S43: YES), the processing proceeds to S47. In S47, the content-processing control unit 63 transfers the data received from the image-formation-data-processing control unit 64 to the PC 9 via the endpoint EP1 and the USB 18. The processing returns to S35.

On the other hand, when data is not received from the image-formation-data-processing control unit 64 (S43: NO), the processing proceeds to S51. In S51, the content-processing control unit 63 determines whether an end signal SS1 is received from the image-formation-data-processing control unit 64. When the end signal SS1 is not received (S51: NO), the processing returns to S35. On the other hand, when the end signal SS1 is received (S51: YES), the processing returns to S9. The content-processing control unit 63 is returned to the idle state.

<Effects>

Effects of the communication system 1 according to this embodiment are explained. With the communication system 1, data received via the one endpoint EP1 can be analyzed by the content-processing control unit 63. When the received data is data including the HTTP command (S27: YES), the content-processing control unit 63 can transfer the received data to the Web server 62 (S69). When the received data is not data including an HTTP data (S27: NO), the content-processing control unit 63 can transfer the received data to the printing engine 70 (S39). Consequently, it is possible to share the one endpoint EP1 between the Web server 62 that uses the data including the HTTP command and the printing engine 70 that uses data including the particular command other than the HTTP command. Therefore, compared with a case in which dedicated endpoints are respectively provided in the Web server 62 and the printing engine 70, it is possible to reduce a number of necessary endpoints. Consequently, it is possible to prevent a situation in which an area of the USB interface unit 42, which is the hardware mounted with the endpoints, increases and a situation in which costs of the USB interface unit 42 increase.

In the Web server 62, various kinds of processing can be executed on the basis of data received via the USB 18 and the endpoint EP1. Further, various kinds of processing can be executed on the basis of TCP data packets received via the LAN communication 92 and the LAN interface unit 43. Consequently, it is possible to simultaneously perform communication of data including the HTTP command performed using the USB 18 and communication of data including the HTTP command performed using the LAN communication 92, which is a TCP communication line.

Data described in the PostScript (registered trademark) language and data described in the PCL language can be distinguished by the image-formation-data-processing control unit 64. The data described in the PostScript (registered trademark) language can be allocated to the PS parser 71 and the data described in the PCL language can be allocated to the PCL parser 72. Consequently, data can be transmitted to a parser corresponding to a description language. Therefore, it is possible to cope with a plurality of kinds of description languages.

The content-processing control unit 63 can determine whether the received data is data including the HTTP command by analyzing a header portion of the data stored in the one endpoint EP1 (S23). Consequently, since an analysis amount of the data can be suppressed, it is possible to reduce a load of processing in allocating the data received via the USB 18 to the Web server 62 or the image-formation-data-processing control unit 64.

In communication by a USB standard, unlike communication by a TCP, a packet transmitted first in order to establish connection (e.g., an SYN packet) is absent. Therefore, when communication of data including the HTTP command is performed using the USB 18, it is difficult to identify a header portion of the data. When a plurality of data is continuously received (e.g., data of a main page and image data corresponding to the GIF1 to the GIF3 are received when the setting screen 141 shown in FIG. 5 is opened), by detecting elapse of a communication interval time larger than the predetermined time, the content-processing control unit 63 of the communication system 1 can determine that the communication of the group of data for executing one task is completed (S85:YES). When data is received from the USB 18 after the elapse of the communication interval time larger than the predetermined time (S11: YES), the content-processing control unit 63 can determine that reception of a group of data for executing another task is started. Therefore, the content-processing control unit 63 can recognize that a portion of a predetermined number of bytes from a top of the received data is a header portion (S19:YES). In the content-processing control unit 63 of the communication system 1, when the end of the communication of the data including the particular command other than the HTTP command is detected by the image-formation-data-processing control unit 64 (S51: YES), the content-processing control unit 63 can determine that one task such as printing processing in the printing engine 70 is completed. When communication of data is started after a point when the end of the communication of the data including the particular command other than the HTTP command is detected, the content-processing control unit 63 can determine that reception of a group of data for executing another task is started. Therefore, the content-processing control unit 63 can recognize that a portion of a predetermined number of bytes from a top of data communicated first is a header portion (S19:YES). Consequently, when communication of data including the HTTP command is performed using the USB 18, the content-processing control unit 63 can identify a header portion of received data. Therefore, the content-processing control unit 63 can determine, by analyzing the header portion, whether the received data is the data including the HTTP command (S27).

In the USB 18, unlike the TCP, a packet for disconnection (e.g., a FIN packet) is absent. Therefore, when communication of data including the HTTP command is performed using the USB 18, it is difficult to identify, through disconnection, a boundary between a group of data for a certain task (e.g., a plurality of data for displaying the setting screen 141) and a group of data for another task (e.g., a plurality of data for displaying another screen). If a plurality of data is continuously received, when elapse of a communication interval time larger than the predetermined time is detected (S85:YES), the content-processing control unit 63 of the communication system 1 can identify that the communication interval time is a boundary between the group of data and the group of data.

When data at a top of the group of data is data including the HTTP command (S27: YES), the content-processing control unit 63 can determine that all the group of data is the data including the HTTP command. Therefore, the content-processing control unit 63 can set the Web server 62 as a transfer destination of data communicated following the top data (S59). When the boundary between the group of data and the group of data is identified (S85:YES), the content-processing control unit 63 can be set in a state in which the transfer destination of the data is neither the Web server 62 nor the image-formation-data-processing control unit 64 (i.e., the idle state) (S9). Consequently, the content-processing control unit 63 can recognize the boundary between the group of data and the group of data and transfer each of the groups of data to one of the Web server 62 or the image-formation-data-processing control unit 64.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

<Modifications>

In the configuration explained above, the endpoints for reception EP1a to EP3a function as the buffers configured to store data received from the PC 9. However, the present invention is not limited to this configuration. The MFP 51 may include buffers respectively connected to the endpoints for reception EP1a to EP3a. The endpoints for reception EP1a to EP3a may store the data received from the PC 9 in the buffers.

Applications that perform communication using the endpoints EP11 and EP1 are not limited to the printing application 24 and the Web browser 23 and may be various applications. For example, instead of the Web browser 23, the scanner driver 30 and the scan application 31 may be connected to the TCP/IP stack 29.

In the configuration explained in this embodiment, in S85 the content-processing control unit 63 determines, according to whether a communication interval time of data is larger than the predetermined time set in advance, whether communication of a group of data for executing one task is completed. However, the present invention is not limited to this configuration. For example, the Web server 62 may analyze input data to detect an end of the communication of the group of data for executing one task. Upon detecting the end of the communication of the group of data, the Web server 62 may transmit an end signal SS2 to the content-processing control unit 63 (see FIG. 2). Consequently, it is possible to detect completion of the communication of the group of data without waiting for elapse of the predetermined time.

In the configuration explained above, the image-formation-data-processing control unit 64 generates the end signal SS1. However, the present invention is not limited to this. For example, the printing engine 70 or the scanner-command processing unit 73 may analyze data to detect the end of the communication of the group of data and generate an end signal.

In the explanation in this embodiment, the printing data described in the PostScript (registered trademark) language and the PCL language is treated. However, other types of PDL languages can also be used. Types of PDL languages discriminated by the image-formation-data-processing control unit 64 are not limited to the two types and may be three or more types.

An application range of the technique described in this specification is not limited to executing the communication for setting the MFP 51 and the communication for transmitting printing data to the MFP 51 using same endpoints of the interface 1. For example, the technique described in this specification can be applied when the communication for setting the MFP 51 and the communication for executing various kinds of processing in the MFP 51 are executed using same endpoints. For example, the technique described in this specification can also be applied when a first Web browser 23 is executed by the PC 9 to perform printing setting in the MFP 51 and a second Web browser 23 is executed by the PC 9 to perform FAX transmission using the Internet and perform mail transmission and reception using the Internet.

Although the MFP 51 has been described as an example the communication device in which the web server 62 is provided, the embodiment is not limited to this mode. The communication device may be any type of device as long as the device is capable of a USB connection, and may be, for example, a PC or a cellphone.

The programs stored in the ROM 33 and the storage unit 35 may be executed by any one of the following configurations: a plurality of CPUs combined with each other; one or more ASICs (an abbreviation for application specific integrated circuit); and one or more CPUs and one or more ASICs combined with each other.

The invention claimed is:

1. An image processing device comprising:
    a Universal Serial Bus Interface (USB I/F) comprising a plurality of USB endpoints for reception, each of the USB endpoints for reception being configured to receive USB data packets transmitted by a data processing device according to a USB protocol; and
    a control device configured to:
        execute one or more processing on the basis of a HyperText Transfer Protocol (HTTP) command;
        execute image processing on the basis of a particular command other than the HTTP command;
        execute USB configuration processing in which the data processing device designates a first USB endpoint from among the plurality of USB endpoints for reception, the first USB endpoint being for receiving content data including the HTTP command and content data including the particular command;
        cause a specific buffer to store content data included in the received USB data packets, the specific buffer being a buffer corresponding to the first USB endpoint for reception; and
        execute content data allocation processing,
    wherein the content data allocation processing includes:
        analyzing the content data stored in the specific buffer;
        causing the content data to be processed in the execution of the one or more processing in a case where the analyzed content data includes the HTTP command; and
        causing the content data to be processed in the execution of the image processing in a case where the analyzed content data includes the particular command.

2. The image processing device according to claim 1, further comprising:
    a Transfer Control Protocol Interface (TCP I/F) configured to receive TCP data packets transmitted by the data processing device according to a TCP protocol,
    wherein the execution of the one or more processing is configured to include executing:
        the one or more processing on the basis of the HTTP command included in the TCP data packets received by the TCP I/F; and
        the one or more processing on the basis of the HTTP command included in the USB data packets received by the USB I/F according to the content data allocation processing.

3. The image processing device according to claim 1, wherein
    the execution of image processing includes:
        forming an image on the basis of image formation data of a first format;
        forming an image on the basis of image formation data of a second format; and
        executing image formation data allocation processing for:
            causing the image formation data of the first format to be processed in the formation of the image on the basis of image formation data of the first format; and
            causing the image formation data of the second format to be processed in the formation of the image on the basis of image formation data of the second format,
    wherein the execution of content data allocation processing includes causing the content data including the particular command stored in the specific buffer to be processed in the execution of image formation data allocation processing.

4. The image processing device according to claim 3, wherein
    the execution of content data allocation processing includes:
        determining whether the content data stored in the specific buffer is data including the HTTP command;
        causing the content data to be processed in the execution of the one or more processing in a case of determining that the content data stored in the specific buffer includes the HTTP command; and
        causing the content data to be processed in the execution of image formation data allocation processing in a case of determining that the content data stored in the specific buffer includes the particular command.

5. The image processing device according to claim 4, wherein
    the execution of content data allocation processing includes:
        analyzing a header portion of the content data stored in the specific buffer;
        determining whether the analyzed content data is the data including the HTTP command;
        causing the content data to be processed in the execution of the one or more processing in a case of determining that the analyzed content data includes the HTTP command; and
        causing the content data to be processed in the execution of image formation data allocation processing in a case of determining that the analyzed content data includes the particular command,
    the execution of image formation data allocation processing includes:
        analyzing the content data;
        causing the content data to be processed in the formation of the image on the basis of image formation data of the first format in a case where the analyzed content data is the image formation data of the first format; and causing the content data to be processed in the formation of the image on the basis of image formation data of the second format in a case where the analyzed content data is the image formation data of the second format.

6. The image processing device according to claim 5, wherein the execution of content data allocation processing includes:

serially communicating a plurality of the content data via the one first USB endpoint for reception; and treating a portion of a predetermined number of bytes from top of the content data communicated most recently as the header portion in a case where communication interval time is larger than predetermined time set in advance, the communication interval time being time between communication time of content data most recently communicated via the first USB endpoint for reception and communication time of content data communicated immediately preceding the content data communicated most recently.

7. The image processing device according to claim 6, wherein the execution of content data allocation processing includes setting, in a case where the header portion of the content data is analyzed and a communication destination of the analyzed content data is set, a communication destination of specific content data to be the same as the communication destination of the analyzed content data, the specific content data being data included in a plurality of content data communicated following the content data of which header portion is analyzed, and the specific content data being data having shorter communication interval time with immediately preceding content data than the predetermined time.

8. The image processing device according to claim 6, wherein the execution of image formation data allocation processing includes detecting an end of communication of the data including the particular command by analyzing the data including the particular command, and the execution of content data allocation processing includes treating a portion of a predetermined number of bytes from top of specific content data as the header portion, the specific content data being data communicated first on and after a point in time when the end of the communication of the data including the particular command is detected.

9. The image processing device according to claim 1, wherein content data including the particular command is sent from an image processing application of the data processing device to the first USB endpoint, content data including the HTTP command is sent from a Web server of the data processing device to the first USB endpoint, the execution of one or more processing includes conducting setting for the image processing in a case where the analyzed content data includes the HTTP command; and the execution of image processing includes executing image processing according to the setting in a case where the analyzed content data includes the particular command.

10. The image processing device according to claim 1, wherein the Universal Serial Bus Interface (USB I/F) comprises a plurality of USB endpoints for transmission, each of the USB endpoints for transmission being configured to transmit USB data packets to the data processing device according to the USB protocol, the control device being further configured to execute USB configuration processing in which the data processing device designates a second USB endpoint from among the plurality of USB endpoints for transmission, the second USB endpoint being a pair with the first USB endpoint, and the second USB endpoint being used to send a response to the data processing device in response to the particular command and the HTTP command;

the execution of one or more processing includes:

transmitting first data, for displaying a setting screen on a display of the data processing device, to the data processing device in a case where the analyzed content data includes an HTTP command instructing to transmit the first data; and conducting the setting for the image processing in a case where content data is received by the first USB endpoint after the transmission of the first data including an instruction to conduct the setting.

11. The image processing device according to claim 1, wherein the execution of image processing includes:

forming an image on the basis of image formation data of a first printer language in a case where the analyzed content data stored in the specific buffer is the image formation data of the first printer language; and forming an image on the basis of image formation data of a second printer language in a case where the analyzed content data stored in the specific buffer is the image formation data of the second printer language.

12. A non-transitory computer-readable storage medium storing a computer program for an image processing device comprising a Universal Serial Bus Interface (USB I/F), the Universal Serial Bus Interface comprising a plurality of USB endpoints for reception, each of the USB endpoints for reception being configured to receive USB data packets transmitted by a data processing device according to a USB protocol, the computer program including instructions for causing a control device of the image processing device to execute:

executing one or more processing on the basis of a HyperText Transfer Protocol (HTTP) command;

executing image processing on the basis of a particular command other than the HTTP command;

executing USB configuration processing in which the data processing device designates a first USB endpoint from among the plurality of USB endpoints for reception, the first USB endpoint being for receiving content data including the HTTP command and content data including the particular command;

causing a specific buffer to store content data included in the received USB data packets, the specific buffer being a buffer corresponding to the first USB endpoint for reception; and executing content data allocation processing, wherein the content data allocation processing includes:

analyzing the content data stored in the specific buffer;

causing the content data to be processed in the execution of the one or more processing in a case where the analyzed content data includes the HTTP command; and causing the content data to be processed in the execution of the image processing in a case where the analyzed content data includes the particular command.

13. An image processing device comprising:
a Universal Serial Bus Interface (USB I/F) configured to receive USB data packets transmitted by a data processing device according to a USB protocol, and cause a specific buffer to store content data included in the received USB data packets, the specific buffer being a buffer corresponding to one USB endpoint for reception; and
a control device configured to:
   execute one or more processing on the basis of a HyperText Transfer Protocol (HTTP) command;
   execute image processing on the basis of a particular command other than the HTTP command; and
   execute content data allocation processing,
wherein the content data allocation processing includes:
serially communicating a plurality of the content data via the one USB endpoint for reception; and
   treating a portion of a predetermined number of bytes from top of the content data communicated most recently as a header portion in a case where communication interval time is larger than predetermined time set in advance,
   the communication interval time being time between communication time of content data most recently communicated via the one USB endpoint for reception and communication time of content data communicated immediately preceding the content data communicated most recently;
analyzing the header portion of the content data stored in the specific buffer;
determining whether the analyzed content data is the data including the HTTP command;
causing content data including the HTTP command stored in the specific buffer to be processed in the execution of the one or more processing; and
causing content data including the particular command stored in the specific buffer to be processed in the execution of the image processing.

* * * * *